(12) United States Patent
Bates

(10) Patent No.: US 6,562,518 B2
(45) Date of Patent: *May 13, 2003

(54) FABRICATION OF HIGHLY TEXTURED LITHIUM COBALT OXIDE FILMS BY RAPID THERMAL ANNEALING

(75) Inventor: John B. Bates, Marietta, GA (US)

(73) Assignee: Lockheed Martin Energy Research Corporation, Oak Ridge, TN (US)

(*) Notice: Subject to any disclaimer, the term of this patent is extended or adjusted under 35 U.S.C. 154(b) by 128 days.

This patent is subject to a terminal disclaimer.

(21) Appl. No.: 09/818,490

(22) Filed: Mar. 27, 2001

(65) Prior Publication Data

US 2001/0051384 A1 Dec. 13, 2001

Related U.S. Application Data

(62) Division of application No. 09/396,997, filed on Sep. 15, 1999, now Pat. No. 6,344,366.

(30) Foreign Application Priority Data

Sep. 6, 2000 (WO) .............................. PCT/US00/24558

(51) Int. Cl.[7] ................................................ H01M 4/58
(52) U.S. Cl. ..................................... 429/231.3; 429/245
(58) Field of Search .............................. 429/231.3, 245

(56) References Cited

U.S. PATENT DOCUMENTS 5,110,696 A    5/1992   Shokoohi et al. ........... 429/218
6,344,366 B1 * 2/2002   Bates ......................... 429/322

OTHER PUBLICATIONS

Bates et al., "Preferred orientation of polycrystalline licoo2 films," *J. of The Electrochem. Soc.*, 147:59–70, 2000.

Fragnaud et al., "Characterization of sprayed and sputter deposited LiCoO2 thin films for rechargeable microbatteries," *J Power Sources*, 63:187–191, 1996.

Lee et al., "Substrate effect on the microstructure and electrochemical properties in the deposition of a thin film LiCoO2 electrode," *Electrochem. Solid–State Ltrs.*, 2:512–515, 1999.

Wang et al., "Characterization of thin–film rechargeable ithium batteries with lithium cobalt oxide cathodes," *J of The Electrochem. Soc*, 143:3203–3213, 1996.

* cited by examiner

*Primary Examiner*—Laura Weiner
(74) *Attorney, Agent, or Firm*—Gray Cary Ware & Freidenrich LLP

(57) ABSTRACT

Systems and methods are described for fabrication of highly textured lithium cobalt oxide films by rapid thermal annealing. A method of forming a lithium cobalt oxide film includes depositing a film of lithium cobalt oxide on a substrate; rapidly heating the film of lithium cobalt oxide to a target temperature; and maintaining the film of lithium cobalt oxide at the target temperature for a target annealing time of at most, approximately 60 minutes. The systems and methods provide advantages because they require less time to implement and are, therefore less costly than previous techniques.

9 Claims, 1 Drawing Sheet

US 6,562,518 B2

FABRICATION OF HIGHLY TEXTURED LITHIUM COBALT OXIDE FILMS BY RAPID THERMAL ANNEALING

CROSS-REFERENCE TO RELATED APPLICATION

This is a divisional of application Ser. No. 09/396,997, filed Sep. 15, 1999 now U.S. Pat. No. 6,344,366.

STATEMENT AS TO RIGHTS TO INVENTIONS MADE UNDER FEDERALLY-SPONSORED RESEARCH AND DEVELOPMENT

This invention was made with Government support under contract No. DE-AC05-96OR22464 awarded by the United States Department of Energy to Lockheed Martin Energy Research Corp., and the Government has certain rights in this invention.

BACKGROUND OF THE INVENTION

1. Field of the Invention

The invention relates generally to the field of lithium cobalt oxide ($LiCoO_2$) films. More particularly, the invention relates to fabrication of highly textured $LiCoO_2$ films by rapid thermal annealing.

2. Discussion of the Related Art

Thin films of $LiCoO_2$ are used as the cathode in thin film lithium and lithium ion batteries. The films are deposited by rf magnetron sputtering of $LiCoO_2$. FIG. 1 shows an x-ray diffraction pattern of an $LiCoO_2$ film annealed for two hours at 700° C. according to the prior art. In order to crystallize the films and achieve the high degree of preferred orientation that optimizes battery performance, they are heated at 700° C. in flowing $O_2$ for 2 hours. In order to lower the cost of manufacturing, it is desirable to shorten the annealing time as much as possible without compromising battery performance.

Heretofore, the requirements of low cost manufacturing and short annealing times referred to above have not been fully met. What is needed is a solution that addresses each of these requirements independently or concurrently. The invention is directed to meeting these requirements, among others.

SUMMARY OF THE INVENTION

A goal of the invention is to reduce the costs associated with $LiCoO_2$ thin films. Another goal is to reduce the annealing times associated with the manufacture of $LiCoO_2$ thin films.

One embodiment of the invention is related to a method for manufacturing $LiCoO_2$ films. The method includes depositing the $LiCoO_2$ film, rapidly heating the $LiCoO_2$ film to a target temperature and holding the temperature of the $LiCoO_2$ film at the target temperature for a target annealing time.

The method can also include rapid cooling of the $LiCoO_2$ film after holding the $LiCoO_2$ film within the target temperature range for the target annealing time. The target temperature is preferably greater than approximately 700° C., more preferably at least approximately 800° C. and most preferably at least approximately 850° C. Further, the target temperature range is preferably approximately 700–1000° C., more preferably approximately 750–950° C. and most preferably approximately 850–950° C. The target annealing time is preferably at most approximately an hour, more preferably at most approximately 30 minutes and most preferably at most approximately 15 minutes. Further, the target annealing time is preferably approximately 5–60 minutes, more preferably approximately 10–20 minutes and most preferably about 12–17 minutes.

The invention includes cathodes made according to the above methods. The invention also includes batteries which include these cathodes.

These, and other, goals and embodiments of the invention will be better appreciated and understood when considered in conjunction with the following description and the accompanying drawings. It should be understood, however, that the following description, while indicating preferred embodiments of the invention and numerous specific details thereof, is given by way of illustration and not of limitation. Many changes and modifications may be made within the scope of the invention without departing from the spirit thereof, and the invention includes all such modifications.

BRIEF DESCRIPTION OF THE DRAWINGS

A clear conception of the advantages and features constituting the invention, and of the components and operation of model systems provided with the invention, will become more readily apparent by referring to the exemplary, and therefore nonlimiting, embodiments illustrated in the drawings accompanying and forming a part of this specification. It should be noted that the features illustrated in the drawings are not necessarily drawn to scale.

DESCRIPTION OF PREFERRED EMBODIMENTS

Figure 1:
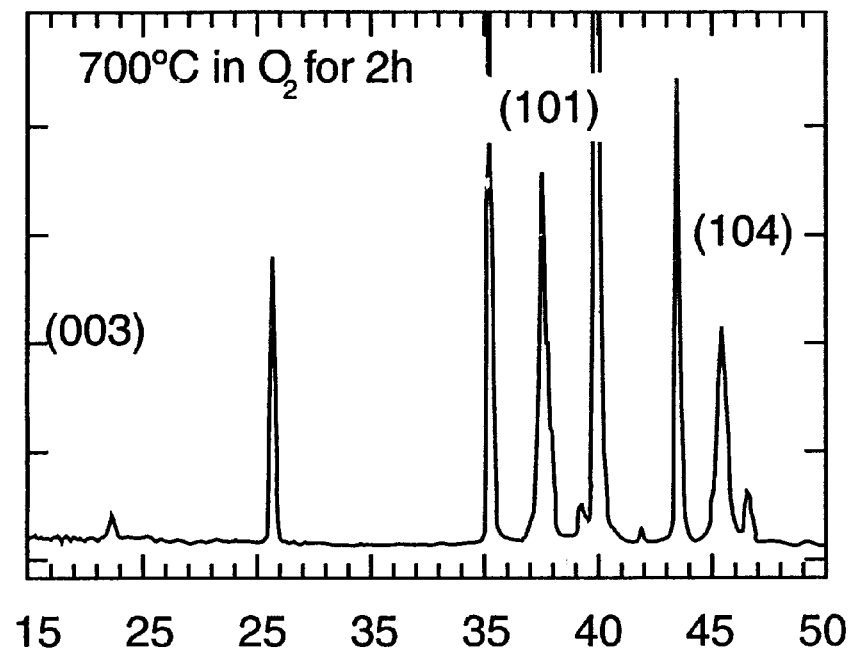
FIG. 1 illustrates an x-ray diffraction pattern of a $LiCoO_2$ film prepared according to the prior art.

The invention and the various features and advantageous details thereof are explained more fully with reference to the nonlimiting embodiments that are illustrated in the accompanying drawings and detailed in the following description of preferred embodiments. Descriptions of well known components and processing techniques are omitted so as not to unnecessarily obscure the invention in detail.

The below-referenced U.S. patent disclose embodiments that were satisfactory for the purposes for which they were intended. The entire contents of U.S. Pat. Nos. 5,314,765; 5,338,625; 5,512,147; 5,561,004; 5,569,520; 5,567,210; 5,597,660; and 5,612,152 are hereby expressly incorporated by reference into the present application as if fully set forth herein.

The invention can include $LiCoO_2$ films and/or highly textured $LiCoO_2$ cathodes. The concept of the invention can include the use of rapid thermal annealing to achieve high crystallinity and texturing in these films and/or cathodes. Although these features are independent, they can be combined in embodiments of the invention.

The invention can include a method for manufacturing $LiCoO_2$ films. The method includes depositing a $LiCoO_2$ film on a substrate, rapidly heating the $LiCoO_2$ film to a target temperature and holding the temperature of the $LiCoO_2$ film at about the target temperature for a target annealing time.

A suitable substrate for depositing the $LiCoO_2$ film includes, but is not limited to, ceramics (such as lumina), semiconductors (such as silicon), or metals (such as stainless steel). Suitable techniques for depositing the $LiCoO_2$ film on the substrate include, but are not limited to, RF magnetron sputtering of $LiCoO_2$ targets in Ar and $O_2$ gas mixtures. The film is preferably deposited to a thickness of approximately 2.5–3 µm (micrometers), more preferably to a thickness of approximately 1 µm and most preferably to a thickness of approximately 2.5–3 µm. The term approximately, as used herein, is defined as at least close to a given value (e.g., preferably within 10% of, more preferably within 1% of, and most preferably within 0.1% of).

After the $LiCoO_2$ film is deposited, it is rapidly heated to the target temperature. Suitable equipment for rapidly heating the $LiCoO_2$ film includes, but are not limited to a tube furnace, box furnace etc. A preferred method for the rapid heating of the $LiCoO_2$ film includes the use of high intensity quartz lamps. The rate of temperature ramp up during the heating is preferably approximately 50–100° C./minute. The time required for the $LiCoO_2$ film to reach the target temperature is preferably at most approximately 15 minutes.

Once the $LiCoO_2$ film has achieved the target temperature, the temperature of the $LiCoO_2$ film is preferably maintained near the target temperature for a target annealing time. The target temperature is preferably greater than approximately 700° C., more preferably at least 800° C. and most preferably at least about 850° C. Further, the target temperature range is preferably approximately 700–1000° C., more preferably approximately 750–950° C. and most preferably approximately 850–950° C. The target annealing time is preferably at most an hour, more preferably at most approximately 30 minutes and most preferably at most approximately 15 minutes. Further, the target annealing time is preferably approximately 5–60 minutes, more preferably approximately 10–20 minutes and most preferably approximately 12–17 minutes.

While the $LiCoO_2$ film is maintained at the target temperature, the temperature of the $LiCoO_2$ film will vary over a range due to the nature of imperfect process controls. This range is preferably at most approximately +5° C. and more preferably at most approximately +/-1C.

After the $LiCoO_2$ film is maintained at the target temperature, the $LiCoO_2$ film can be rapidly cooled to room temperature. Suitable equipment for the rapid cooling include controlled removal from furnace. The ramp down rate of the $LiCoO_2$ film temperature is preferably approximately 50–100° C./minute.

The $LiCoO_2$ film is preferably exposed to an $O_2$ atmosphere during the rapid heating of the $LiCoO_2$ film, while it is maintained at the target temperature and/or during the rapid cooling of the $LiCoO_2$ film. The exposure to the $O_2$ atmosphere can be created by flowing $O_2$ over the $LiCoO_2$ film.

The above methods can provide $LiCoO_2$ films for use with the cathodes in batteries such as thin film lithium and lithium ion batteries. These methods can provide $LiCoO_2$ films having a high degree of orientation of grains and microcrystals within the films that are preferred for optimum battery performance.

EXAMPLE

Specific embodiments of the invention will now be further described by the following, nonlimiting examples which will serve to illustrate in some detail various features of significance. The examples are intended merely to facilitate an understanding of ways in which the invention may be practiced and to further enable those of skill in the art to practice the invention. Accordingly, the examples should not be construed as limiting the scope of the invention.

Figure 2:
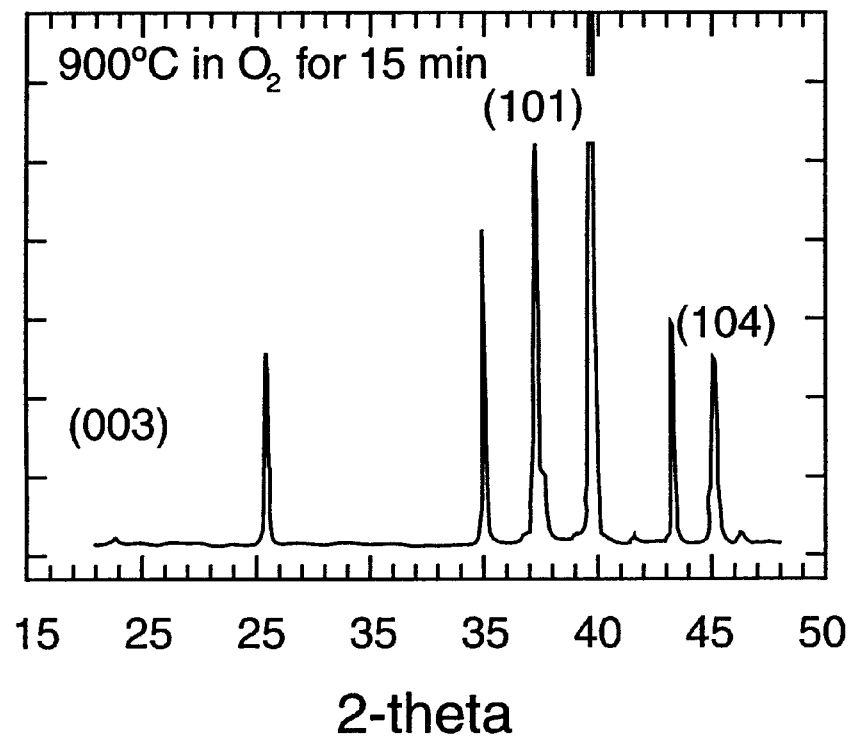
FIG. 2 illustrates an x-ray diffraction pattern of a $LiCoO_2$ film prepared by rapidly heating a $LiCoO_2$ film to 900° C. for 15 minutes representing an embodiment of the invention.

Films of $LiCoO_2$ were deposited by rf magnetron sputtering of $LiCoO_2$ targets in Ar+ $O_2$ gas mixtures. After deposition, the films were heated rapidly in the presence of oxygen to temperatures of between 700 and 900° C., held at the maximum temperature for 15 minutes or less, and then cooled rapidly to room temperature. For example, films of $LiCoO_2$ that were inserted rapidly into a tube furnace at 900° C. in flowing $O_2$ and held for 15 minutes displayed the same high degree crystallinity and preferred orientation as those films annealed at 700° C. for two hours or longer. FIG. 2 shows an x-ray diffraction pattern of another $LiCoO_2$ film made according to the invention. Specifically, annealed for 15 min. at 900° C. The positions of the (003), (101), and (104) reflections of the films are indicated; the remaining peaks are due to the alumina substrates and platinum current collectors. As shown in FIGS. 1 and 2, the high intensity and narrow widths of the (101) and (104) reflections indicate optimum preferred orientation and high crystallinity of the $LiCoO_2$ grains in the film annealed at 900° C. for 15 min. as compared to films annealed according to the prior art, (i.e. annealed at 2 hours at 700° C.).

Films of $LiCoO_2$ thicker than about 1 µm develop a texture during the annealing process in which the majority of the grains are oriented with their (101) and (104) planes parallel to the substrate. This preferred orientation is due to the tendency to minimize the volume strain energy developed in the films during annealing. As the film thickness decreases below 0.5 µm, the texture changes so that most of the grains are oriented with their (003) planes parallel to the substrate as a result of the tendency to minimize surface energy. It is our expectation that lithium transport through (003) oriented grains is nil but rapid enough through the (101)–(104) grains. Therefore, in cathodes with a higher percentage of (003)-oriented grains, lithium transport occurs primarily through the grain boundaries. Because cell resistance is dominated by the electrolyte and eletrolyte-cathode interface, there was no significant dependence of cell resistance on cathode thickness, and therefore it was not possible to measure the bulk resistance of the cathodes and determine the relative grain and grain boundary contributions. The most important process variable in achieving low resistance cathode films is the deposition temperature. Deposition at high temperatures leads to larger grains and increased void fraction. This reduces the contact area between the electrolyte and cathode as well as the contact area between the grains resulting in higher cell resistance.

$LiCoO_2$ films manufactured according to the methods of the invention are cost effective because they requires less time to manufacture. As a result, the methods of the invention reduce the costs associated with manufacturing $LiCoO_2$ films, cathodes including these films and batteries including these cathodes.

A practical application of the invention that has value within the technological arts is film rechargeable lithium and lithium ion batteries. There are virtually innumerable uses for the invention, all of which need not be detailed here.

All the disclosed embodiments of the invention described herein can be realized and practiced without undue experimentation. Although the best mode of carrying out the invention contemplated by the inventors is disclosed above, practice of the invention is not limited thereto. Accordingly, it will be appreciated by those skilled in the art that the invention may be practiced otherwise than as specifically described herein.

For example, the individual components need not be formed in the disclosed shapes, or assembled in the disclosed configuration, but could be provided in virtually any shape, and assembled in virtually any configuration. Further, the individual components need not be fabricated from the disclosed materials, but could be fabricated from virtually any suitable materials. Further, although the $LiCoO_2$ films described herein can be a physically separate module, it will be manifest that the $LiCoO_2$ films may be integrated into the apparatus (e.g., electrode) with which it is associated. Furthermore, all the disclosed elements and features of each disclosed embodiment can be combined with, or substituted for, the disclosed elements and features of every other disclosed embodiment except where such elements or features are mutually exclusive.

It will be manifest that various additions, modifications and rearrangements of the features of the invention may be made without deviating from the spirit and scope of the underlying inventive concept. It is intended that the scope of the invention as defined by the appended claims and their equivalents cover all such additions, modifications, and rearrangements. The appended claims are not to be interpreted as including means-plus-function limitations, unless such a limitation is explicitly recited in a given claim using the phrase "means-for." Expedient embodiments of the invention are differentiated by the appended subclaims.

What is claimed is:

1. A cathode made by a process of:

depositing a film of $LiCoO_2$ on a substrate;

rapidly heating the film of $LiCoO_2$ to a target temperature; and maintaining the film of $LiCoO_2$ at the target temperature for a target annealing time of at most approximately 60 minutes, wherein a majority of grains in the film of $LiCoO_2$ are oriented with their (101) and (104) planes parallel to the substrate.

2. The cathode of claim 1, wherein the substrate includes at least one material selected from the group consisting of ceramics, semiconductors, and metals.

3. The cathode of claim 1, wherein the target temperature is greater than approximately 700° C.

4. The cathode of claim 3, wherein maintaining the film of $LiCoO_2$ at the target temperature of greater than approximately 700° C. for the target annealing time of approximately 10–20 minutes results in the majority of grains in the film of $LiCoO_2$ oriented with their (101) and (104) planes parallel to the substrate.

5. The cathode of claim 1, wherein the target temperature is at least approximately 800° C.

6. The cathode of claim 1, wherein the target annealing time is at most approximately 30 minutes.

7. The cathode of claim 6, wherein maintaining the film of $LiCoO_2$ at the target temperature for the target annealing time of approximately 10–20 minutes results in the majority of grains in the film of $LiCoO_2$ are oriented with their (101) and (104) planes parallel to the substrate.

8. The cathode of claim 1, wherein the target annealing time is approximately 12–17 minutes.

9. A battery including the cathode of claim 1.

* * * * *